Oct. 30, 1928.
L. B. EATON
1,689,332
TRAY STACKING MACHINE
Filed May 9, 1923      5 Sheets-Sheet 2
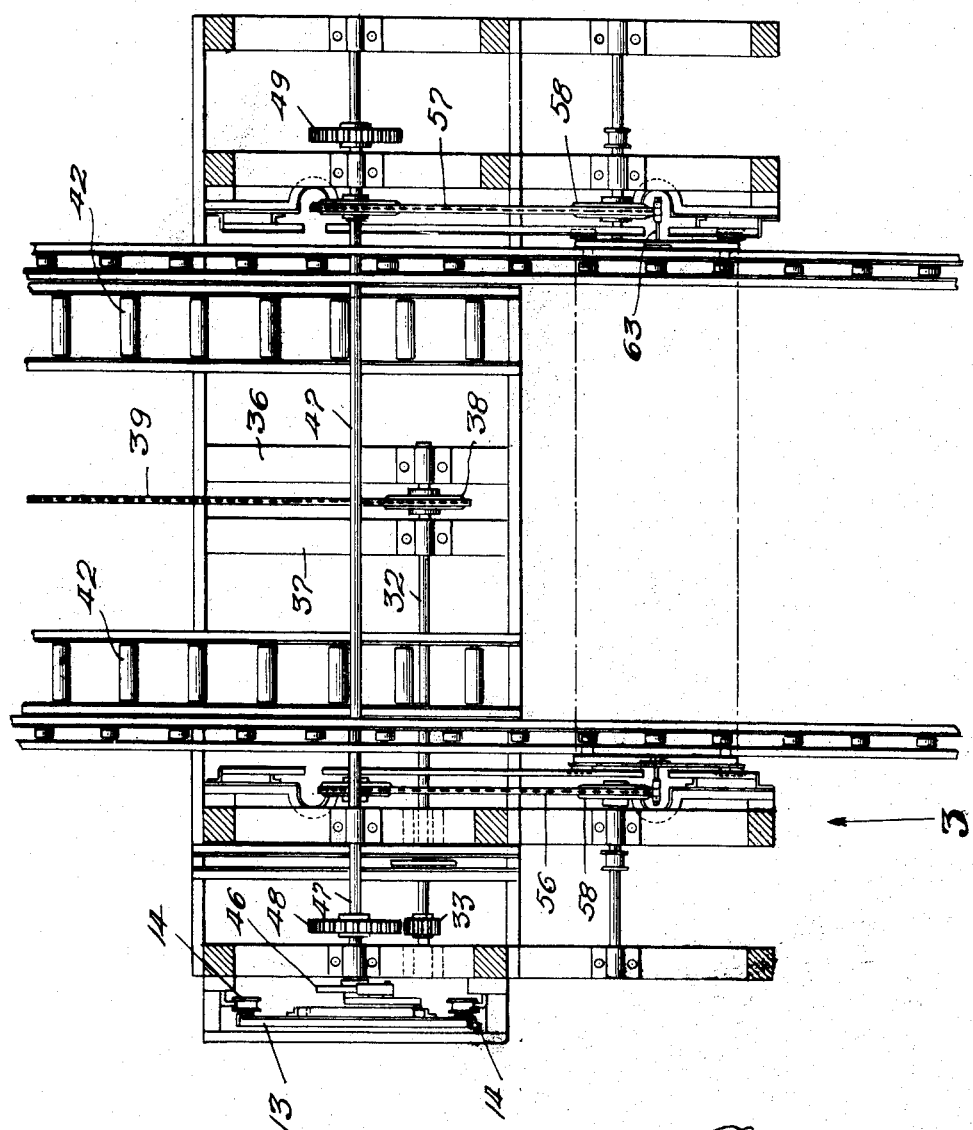

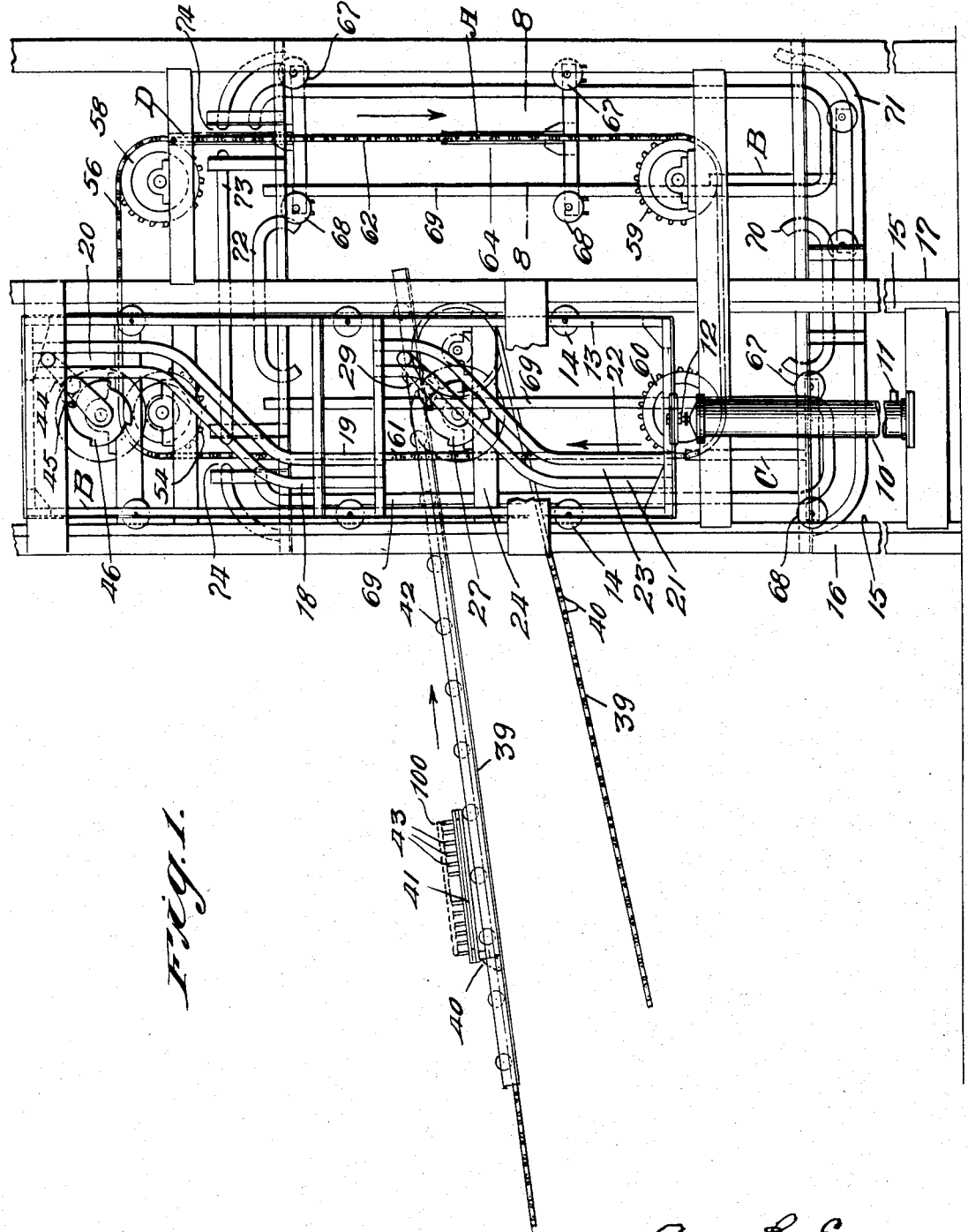

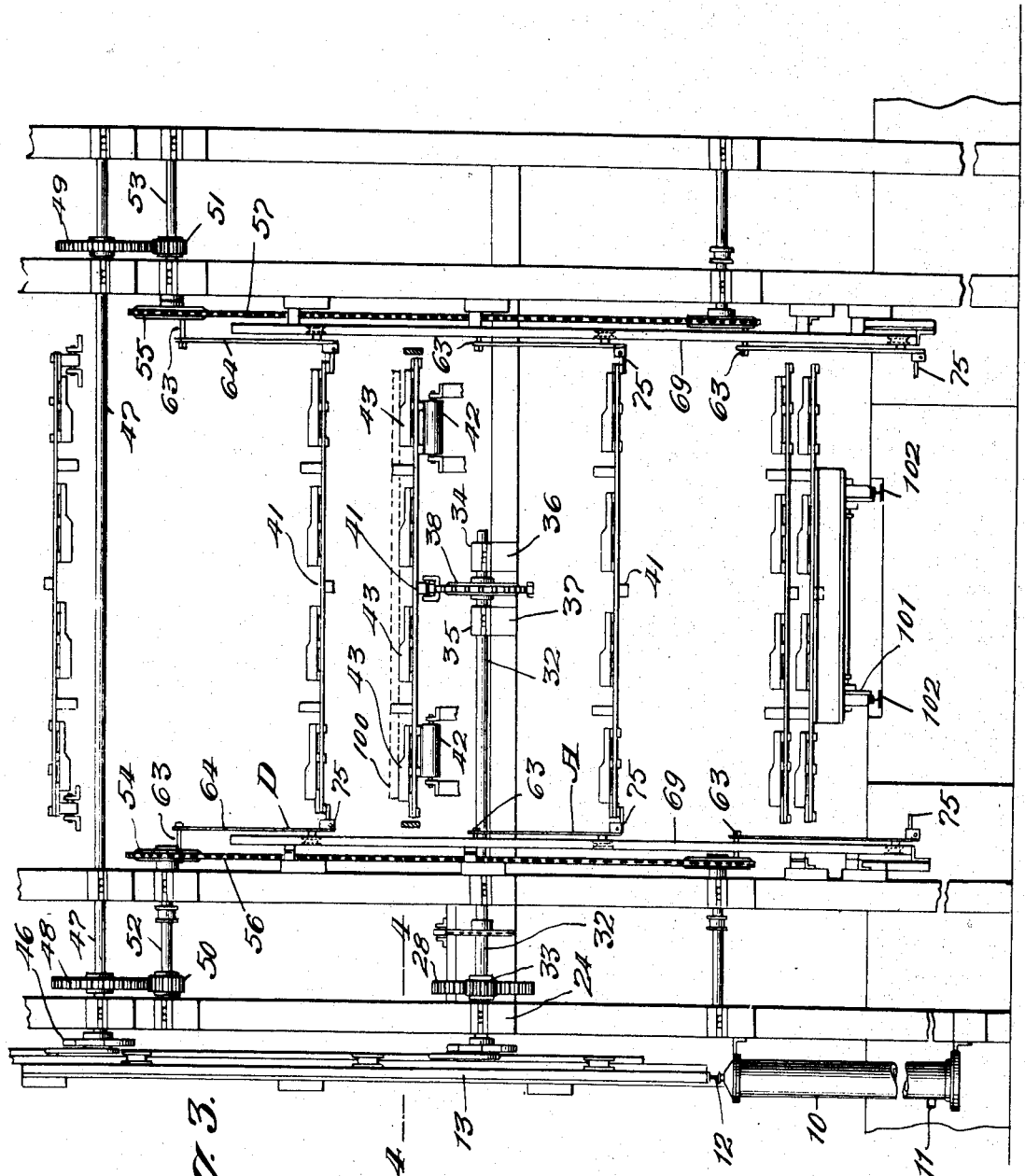

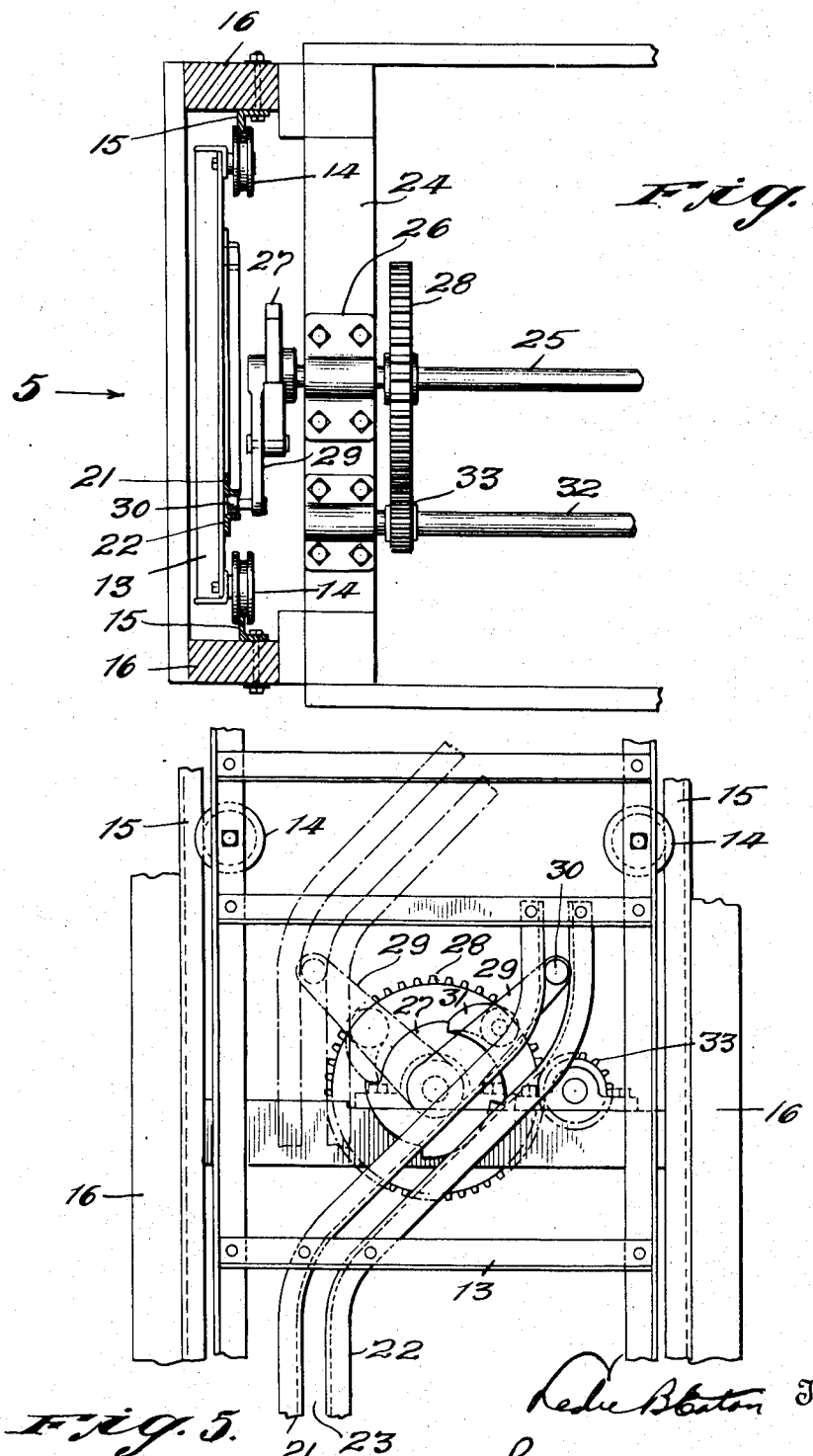

Oct. 30, 1928.
L. B. EATON
1,689,332
TRAY STACKING MACHINE
Filed May 9, 1923      5 Sheets-Sheet 5
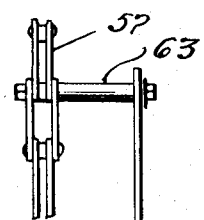
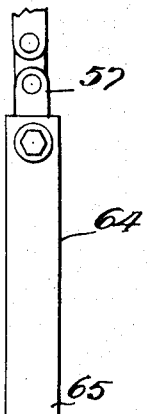
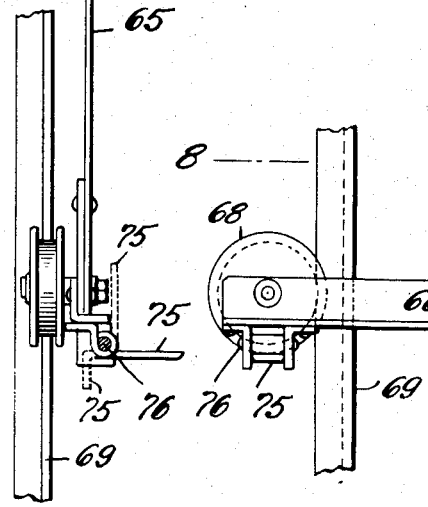
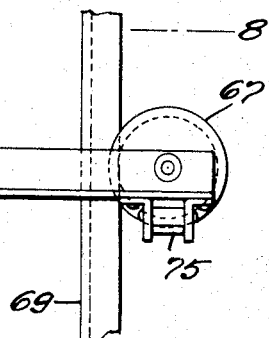
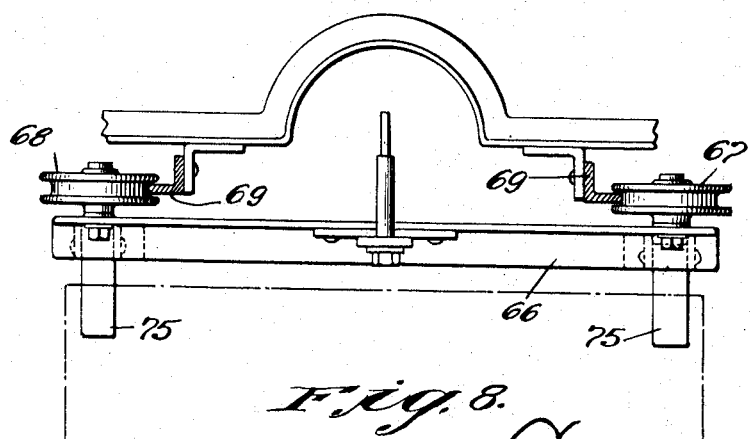

Patented Oct. 30, 1928.

1,689,332

UNITED STATES PATENT OFFICE.

LESLIE B. EATON, OF SAN FRANCISCO, CALIFORNIA, ASSIGNOR TO NATIONAL FIBRE-FORM COMPANY, OF SAN FRANCISCO, CALIFORNIA, A CORPORATION OF DELAWARE.

TRAY-STACKING MACHINE.

Application filed May 9, 1923. Serial No. 637,659.

The present invention relates to a stacking machine, and contemplates conveyors and associated devices for transferring articles into a stack. Many articles, made in machines which deliver them one at a time, need to be stacked, either for shipment or for some of the later steps in the manufacturing process.

The present invention is designed to provide a device which can take these articles, delivered one at a time, and deposit them in a stack. The illustrative embodiment herein shown and described is a machine which has been developed for stacking trays which are adapted to carry large sheets of wall-board or the like. The wall-board for which this particular machine has been designed is made up of paper pulp, in machines especially designed for the purpose, and is delivered by these machines in a moist condition. The moist wall-board must be dried before it can be shipped or used. The illustrative embodiment of the invention stacks these loaded trays so that they can be conveniently moved into a drying-chamber.

Among the objects of the present invention are the provision of a stacking mechanism which is adapted to receive articles one at a time and to deposit them on top of one another in a stack, the provision of an operating mechanism so that the movement of the parts is properly synchronized, the provision of devices for handling the articles without inverting them, and the provision of suitable devices for maintaining the moving parts in proper alignment.

The accompanying drawings show, for purposes of illustration, a convenient embodiment of the present invention, which, as above described, is particularly designed for stacking trays carrying sheets of wall-board. It is of course obvious that the invention is capable of embodiment in different structures.

In these drawings:

Fig. 1 is a side elevation of the machine with the parts broken away;

Fig. 2 is a plan view with the parts in section;

Fig. 3 is an end elevation taken in the direction of the arrow 3 of Fig. 2;

Fig. 4 is an enlarged section taken on the line 4—4 of Fig. 3;

Fig. 5 is a side elevation taken in the direction of the arrow 5 of Fig. 4;

Fig. 6 is a side elevation of the carriage used for carrying the articles;

Fig. 7 is a view taken at right angles to the view of Fig. 6; and

Fig. 8 is an enlarged horizontal section taken through the line 8—8 of Figs. 1 and 7.

Similar reference-characters refer to corresponding parts throughout the several views.

The stacking machine may be operated in any convenient manner, but there is here shown an air cylinder 10 to which compressed air may be admitted through a pipe 11. This air cylinder has a piston (not shown), and a piston-rod 12 extends out through the top of the air cylinder. This rod 12 is connected to a reciprocatory frame 13, here shown in the form of a rectangular frame made up of angle iron. The reciprocating frame 13 is provided with rollers 14, which ride on angle irons 15 supported from parallel posts 16 and 17 in the main framework of the machine. The frame 13 may be provided with a suitable counter-weight, if desired. The frame 13 is also provided near the top with curved angle irons 18 and 19 extending diagonally from the right-hand side of the frame to the left-hand side of the frame. They are spaced apart to provide a cam-track 20 from which certain of the mechanism of the stacker may be operated in the manner to be described. The lower part of the frame 13 is provided with another pair of curved angle irons 21 and 22, separated as before, to provide a cam-track 23.

The main frame of the machine has a horizontal cross-member 24 carried adjacent the curved members 21 and 22, as shown in Figs. 1, 3, and 4. A shaft 25 is mounted in a suitable bearing block 26, carried on the cross-member 24. The shaft 25 is provided with a driving ratchet 27 and a gear 28 fixed to it. An arm 29 is loosely mounted on the end of shaft 25, and the outer end of this arm is provided with a roller 30, adapted to travel in the cam-track 23. The arm is also provided with a pawl 31 which is adapted to cooperate with the teeth on the ratchet-wheel 27.

As the frame 13 is reciprocated, the cam, provided by the curved members 21 and 22, is moved from the position indicated in full lines in Fig. 5 to the position indicated in dotted lines. During this movement, the arm 29 is moved from the full line position to the dotted line position, and the ratchet 27 is advanced a quarter revolution. The advancing of the ratchet turns the shaft 25, gear 28, and this in turn drives the shaft 32 through a gear 33, preferably one-fourth the size of gear 28. In this manner, the shaft 32 is given one complete revolution each time the frame 13 is raised. It is of course obvious that, during the lowering movement of the frame 13, the pawl 31 is brought back behind the preceding tooth on the ratchet.

The other end of the shaft 32 is mounted in bearings 34 and 35 and carried on horizontal members 36 and 37 of the machine frame. A sprocket gear 38 is keyed to the shaft 32 and this gear drives a sprocket chain or conveyor 39 having speed-apart lugs 40 for advancing the articles to be stacked. The articles here shown are in the form of comparatively long trays 41, the ends of which ride on rollers 42. These trays are provided with suitable supporting devices 43 for the articles to be stacked with the trays.

The follower 44 for the upper cam-track 20 is similar to the follower 30 for the other cam-track heretofore described, and it operates, through a pawl 45, a ratchet wheel 46 fastened to a shaft 47. The shaft 47 is advanced a quarter revolution by the reciprocation of the frame 13 in a manner similar to the turning of the shaft 25. The shaft 47 is mounted in the framework of the machine and extends across the top of the machine, as shown in Figs. 2 and 3.

This shaft 47 is provided with duplicate gears 48 and 49 which mesh with pinions 50 and 51 mounted on short shafts 52 and 53. These pinions are also preferably one-quarter the size of the gears 48 anad 49. The shafts 52 and 53 are provided with sprocket gears 54 and 55 for driving sprocket chains 56 and 57, which pass about sprocket wheels 58, 59 and 60, as shown in Fig. 1. The wheel 59 is directly under the wheel 58, and the wheel 60 is directly under the wheel 54. In this way the chain 56 is provided with two vertical portions 61 and 62, the former of which travels vertically upward and the other travels vertically downward, as indicated by the arrows in Fig. 1.

The chains 56 and 57 are provided with pins 63 which support article carriers or carriages 64, shown in detail in Figs. 6, 7, and 8. These carriages are suspended freely from the pins 63, and are provided with a comparatively long vertical member 65, and a lower cross-member 66. The cross-member is provided with rollers 67 and 68 near the ends thereof, and these rollers cooperate with a system of fixed guides, so as to keep the carriage in a predetermined path. These guides may be in the form of vertical angle irons 69 carried on the framework of the machine, as shown in Figs. 1, 3, 6, 7, and 8. These vertical guides insure that the carriages will travel vertically downward or upward, as the case may be, and will prevent all swinging of the carriages about the pins 63.

When the carriage A (shown at the right of Fig. 1) passes down to the position of the carriage B, it will be noted that the carriage hangs below the sprocket wheel 59. Auxiliary guides 70 and 71 maintain the carriage B in the proper position and permit it to move horizontally with the chain. The guides 70 and 71 are curved in a suitable manner to facilitate directing the rollers. As the carriage B moves to the left to the position of the carriage C, it is obvious that the rollers 67 and 68 will again come into engagement with the vertical guides 69—69; hence the carriages C will be held in a predetermined path during their upward travel. The upper part of the machine is provided with suitable auxiliary guides 72 and 73, similar to the guides 70 and 71. It will be noted that these guides are spaced underneath the gears 54 and 58, and that they have suitable openings 74 to permit the pins 63 to pass.

The cross-members 66 of the carriages are provided with fingers 75 pivotally mounted on shafts 76. These fingers normally project inwardly, as shown in full lines in Fig. 6, but they may be tilted, in a manner to be described, to the position indicated in dotted lines.

The operation of the machine is as follows:

The reciprocation of the frame 13 intermittently advances both the conveyor chain 39 and the chains 56 and 57 carrying the carriages. The cams are so arranged that the conveyor systems advance alternately. The parts are so timed that the tray 41, loaded with material 100, as indicated in dotted lines, is brought in between the conveyor chains 56 and 57 and is brought to just the proper position to be carried away by a pair of carriages. After the conveyor 39 has stopped movement and the tray is in a position of rest, a pair of carriages opposite one another on the chains 56 and 57, is brought into position so that its fingers 75 may engage the lower edge of the tray 41. The tray is then lifted from the conveyor 39 and is carried up by the advancing chains 56 and 57. It is then carried horizontally across to the position indicated at D in Figs. 1 and 3, whereupon it is lowered in an obvious manner. The movement of the carriages is, of course, in the present embodiment of the machine, intermittent. Successive loaded trays are delivered to the carriages in an obvious manner.

A truck 101 is mounted on rails 102 as shown in Fig. 3, and this truck is in a position to receive the trays as they are lowered by the chains 56 and 57. The first tray that is brought around by the stacking-machine rests upon the top of the truck 101 and the emptied carriages 64 pass down as above described. The next loaded tray that comes along is deposited on top of the first one, as indicated in Fig. 3. The movable fingers 75 engage the previously deposited tray and are tilted to the dotted line shown in Fig. 6, thereby permitting the carriages to pass the stacked articles. It is of course obvious that any number of articles can be stacked within the limits of the size of the machine; and when a suitable load has been deposited on the truck, the machine may be stopped and another empty truck substituted. As the conveyor 39 is actuated from the same source of power that actuates the conveyors 56 and 57, it is of course obvious that the parts may at all times be properly synchronized, and that all parts may be stopped at the same time to permit removing the loaded truck.

What is claimed is:

1. A means for operating the conveyors of a stacking machine comprising, a movable frame, an air cylinder for moving the frame, two cams on the frame, gear trains each having a follower for the corresponding cam, each gear train being connected to a conveyor.

2. A means for operating the conveyors of a stacking machine comprising, a movable frame, an air cylinder for moving the frame, two cams on the frame, gear trains each having a follower for the corresponding cams, each gear train being connected to a conveyor through a one-way drive, the cams and followers being so interrelated that the conveyors are advanced intermittently and in alternation.

3. A machine for stacking articles comprising an elevator including pairs of parallel spaced vertically disposed chains, a supply conveyor adapted to bring the articles between the elevator chains, the elevator chains having devices for taking the articles off the supply conveyor and supporting them while the elevator transports the loaded devices to an article receiving device interposed between the elevator chains, and means for alternately actuating said supply conveyor and said elevator comprising a vertically reciprocating frame, cam tracks in said frame, and cam followers engaging said cam tracks and associated respectively with said supply conveyor and said elevator.

4. In a stacking machine comprising a plurality of conveyors adapted for alternate operation, means for moving said conveyors alternately comprising a vertically disposed reciprocating frame, cam tracks carried by said frame, and cam followers associated respectively with said conveyors engaging in said cam tracks.

LESLIE B. EATON.